United States Patent
Avery et al.

(10) Patent No.: US 10,997,197 B2
(45) Date of Patent: *May 4, 2021

(54) DEPENDENCIES BETWEEN SITE COMPONENTS ACROSS GEOGRAPHIC LOCATIONS

(71) Applicant: International Business Machines Corporation, Armonk, NY (US)

(72) Inventors: Kenytt D. Avery, Newport Beach, CA (US); Edward L. Bader, Los Angeles, CA (US); Patricia V. Gatewood, Costa Mesa, CA (US); Kevin N. Trinh, Garden Grove, CA (US)

(73) Assignee: International Business Machines Corporation, Armonk, NY (US)

(*) Notice: Subject to any disclaimer, the term of this patent is extended or adjusted under 35 U.S.C. 154(b) by 421 days.

This patent is subject to a terminal disclaimer.

(21) Appl. No.: 15/277,400

(22) Filed: Sep. 27, 2016

(65) Prior Publication Data

US 2018/0089240 A1 Mar. 29, 2018

(51) Int. Cl.
*G06F 16/00* (2019.01)
*G06F 16/27* (2019.01)

(52) U.S. Cl.
CPC .................... *G06F 16/27* (2019.01)

(58) Field of Classification Search
CPC ....................................... G06F 16/27
See application file for complete search history.

(56) References Cited

U.S. PATENT DOCUMENTS

| | | | |
|---|---|---|---|
| 7,451,347 B2 | 11/2008 | Subbaraman et al. | |
| 7,657,536 B2 | 2/2010 | Newport | |
| 8,260,742 B2 | 9/2012 | Cognigni et al. | |
| 8,484,645 B2 | 7/2013 | Chandnani | |
| 8,918,490 B1* | 12/2014 | Rattner | H04L 41/0816 709/223 |
| 8,949,147 B1* | 2/2015 | Chowdhury | G06Q 10/087 705/1.1 |
| 9,075,596 B2 | 7/2015 | Tseitlin et al. | |
| 9,135,591 B1 | 9/2015 | Nicol et al. | |

(Continued)

FOREIGN PATENT DOCUMENTS

WO 2015/181758 A1 12/2015

OTHER PUBLICATIONS

Garcia-Carmona et al.; "A Repository for Integration of Software Artifacts With Dependency Resolution and Federation Support", ICSOFT CCIS, vol. 303, Jan. 2013, pp. 166-180.

(Continued)

*Primary Examiner* — Tamara T Kyle
*Assistant Examiner* — Lahcen Ennaji
(74) *Attorney, Agent, or Firm* — Farrokh Pourmirzaie; Edell, Shapiro & Finnan, LLC

(57) ABSTRACT

A method, a system, and a computer program product are provided. In various embodiments, an object is stored within a first data storage system resource indicating a dependency on a second data storage system resource, wherein the dependency requires collocation of the first data storage system resource and the second data storage system resource. An action applied to any one of the first data storage system resource and the second data storage system resource may be controlled based on the dependency.

6 Claims, 7 Drawing Sheets

(56) References Cited

U.S. PATENT DOCUMENTS

| | | | |
|---|---|---|---|
| 9,298,448 B2 | 3/2016 | Elias et al. | |
| 2006/0020937 A1 | 1/2006 | Schaefer et al. | |
| 2006/0047776 A1 | 3/2006 | Chieng et al. | |
| 2008/0250267 A1* | 10/2008 | Brown | G06F 11/1482 714/4.1 |
| 2009/0144305 A1* | 6/2009 | Little | H04L 67/10 |
| 2014/0379634 A1 | 12/2014 | Yoakum et al. | |
| 2015/0127682 A1 | 5/2015 | Phelan et al. | |
| 2015/0142803 A1 | 5/2015 | McClelland et al. | |
| 2015/0242435 A1 | 8/2015 | He | |
| 2016/0062853 A1* | 3/2016 | Sugabrahmam | G06F 3/0647 714/4.11 |
| 2016/0092526 A1 | 3/2016 | Kothari et al. | |
| 2016/0253770 A1* | 9/2016 | Downs | G06Q 50/184 705/3 |
| 2018/0074724 A1* | 3/2018 | Tremblay | G06F 3/0611 |
| 2018/0146031 A1* | 5/2018 | Li | H04L 41/0806 |

OTHER PUBLICATIONS

Raemaekers et al.; "The Maven Repository Dataset of Metrics, Changes, and Dependencies", MSR IEEE/ACM 10th Working Conference on, May 18-19, 2013, pp. 221-224.

"A Successful Data Center Migration—Cradle to Grave", Infosys, 2011, pp. 1-44.

Gansler, Bruce; "Data center application tracking and dependency mapping", Asset-Point, pp. 1-2, retrieved on Jun. 29, 2016 from http://www.asset-point.com/docs/AssetPoint_WP_Dependency_Mapping.pdf.

List of IBM Patents or Patent Applications Treated as Related, Dec. 2017, 1 Page.

\* cited by examiner

DEPENDENCIES BETWEEN SITE COMPONENTS ACROSS GEOGRAPHIC LOCATIONS

BACKGROUND

Present invention embodiments pertain to multiple site components, which should be collocated for performance reasons. In particular, present invention embodiments pertain to storing dependency information within an object of a data storage system resource to control operations, wherein the dependency information indicates at least one other data storage system resource that should be collocated with the data storage system resource.

Systems, including but not limited to enterprise content management (ECM) systems and case manager (CM) systems, often require multiple data storage system resources to be functionally linked. For example, one records management application built on top of an ECM system uses two data repositories: a first data repository for record source documents and a second data repository for a file plan. Similarly, one case management application built on top of a CM system uses two data repositories: a first data repository to store designs for case management solutions and a second data repository that includes active case instances for a deployed solution.

When executing an application such as the records management application or the case management application, nothing prevents an administrator from creating or moving a data storage system resource such as, for example, a data repository, in or to a geographical region that is different from a geographical region of one or more other data repositories that support the application. Additional overhead for coordinating transactions across data storage system resources in different geographical regions could result in increased latency, timeouts, degraded application performance, poor user experiences, and additional support costs.

A common approach to compensate for moving a data storage system resource includes monitoring performance counters and/or use reports regarding performance issues. Initial attempts at compensation included placing dire warnings in documentation regarding performance implications of moving individual site components to remote locations. However, performance-related documentation is often maintained separately from administrative or provisioning documentation, and is consulted reactively, after an issue has been reported.

Other approaches such as, for example, grouping virtual machines and moving a virtual machine as a unit are too coarse-grained: some applications may tolerate remote site components, while other applications may not, and both such applications may reside on a single server.

Existing cloud and cluster management software for managing servers or services provide dependency management. For example, some cluster management software permits dependency relationships to be established between resources such as filesystems and server software in a cluster. However, administrators must have an understanding of the dependency relationships of the cluster management software and the dependency relationships are configured external to the cluster management software (i.e., components have no knowledge of each other).

SUMMARY

According to embodiments of the present invention, a computer-implemented method, a system, and a computer program product are provided.

In an aspect of the invention, a method is provided. In the method, an object indicating a dependency on a second data storage system resource is stored within a first data storage system resource, wherein the dependency requires collocation of the first data storage system resource and the second data storage system resource. An action applied to any one of the first data storage system resource and the second data storage system resource is controlled based on the dependency.

In a second aspect of the invention, a system is provided. The system includes at least one processor and a memory connected with the at least one processor. The memory includes instructions, which when executed by the at least one processor causes the at least one processor to be configured to: store an object within a first data storage system resource indicating a dependency on a second data storage system resource, wherein the dependency requires collocation of the first data storage system resource and the second data storage system resource; and control an action applied to any one of the first data storage system resource and the second data storage system resource based on the dependency.

In a third aspect of the invention, a computer program product is provided. The computer program product includes a computer readable storage medium having computer readable program code embodied therewith for execution on a processing system to: store an object within a first data storage system resource indicating a dependency on a second data storage system resource, wherein the dependency requires collocation of the first data storage system resource and the second data storage system resource; and control an action applied to any of the first data storage system resource and the second data storage system resource based on the dependency.

BRIEF DESCRIPTION OF THE DRAWINGS

Generally, like reference numerals in the various figures are utilized to designate like components.

DETAILED DESCRIPTION

Figure 1:
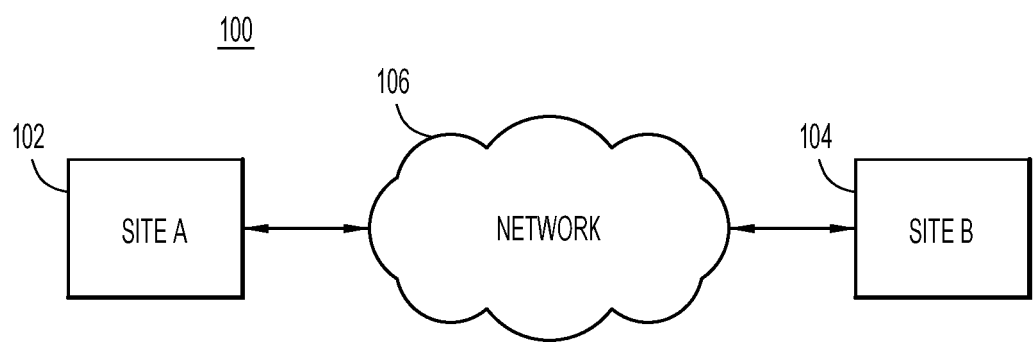
FIG. 1 illustrates an example environment in which various embodiments may be implemented.

FIG. 1 illustrates an example environment 100 in which various embodiments may be implemented. Example environment 100 may include site A 102, site B 104, and a network 106 connecting site A 102 and site B 104. Network 106 may include a general wide area network (WAN) and/or a public network (e.g., the Internet). Site A 102 and site B 104 may include a local area network, one or more servers, one or more databases and one or more user devices.

Figure 2:
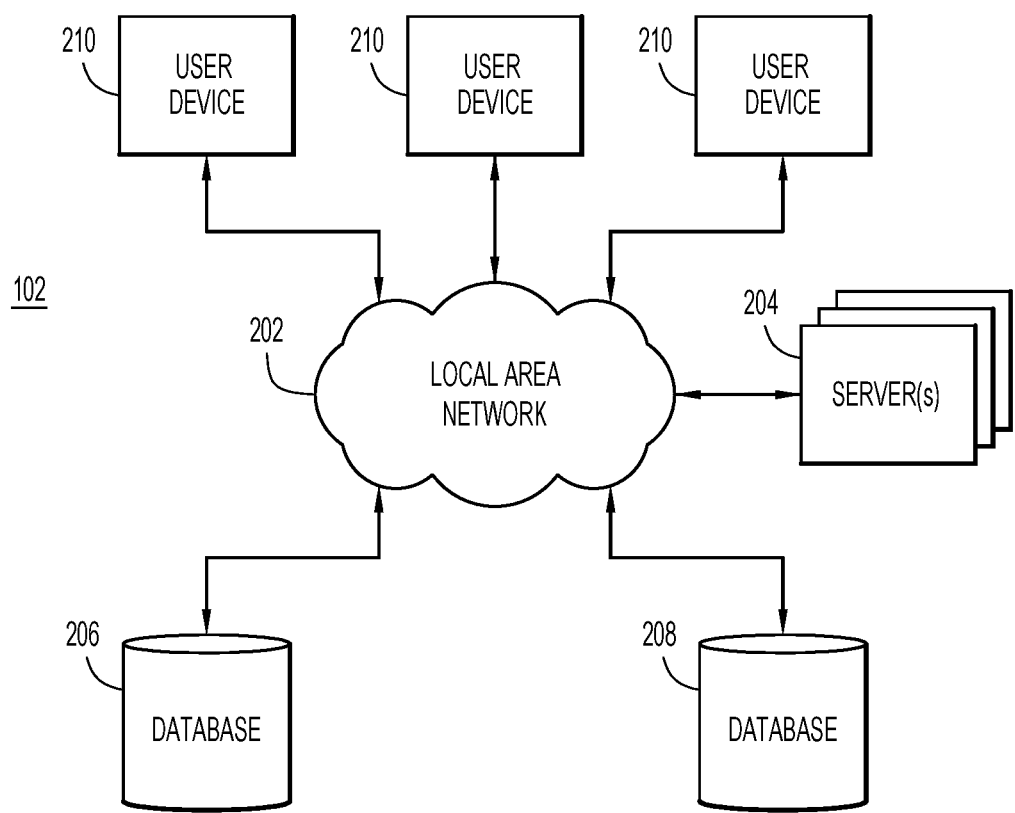
FIG. 2 illustrates, in more detail, site A of FIG. 1.

FIG. 2 illustrates site A 102 in more detail. Site A 102 may include a local area network 202 and one or more servers 204, databases 206, 208 and user devices 210 connected to local area network 202.

Figure 3:
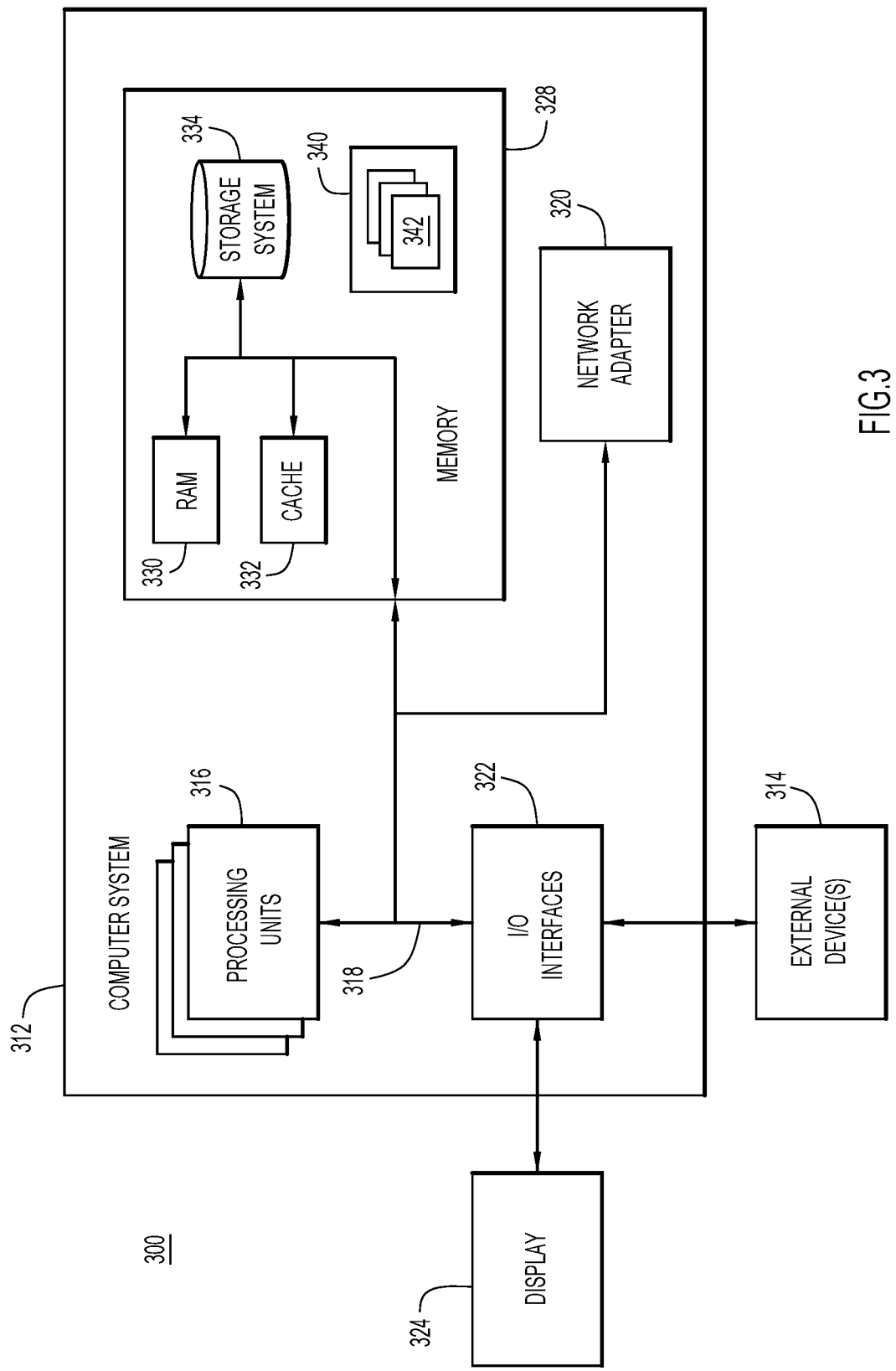
FIG. 3 illustrates an example processing device which may implement a server and/or a user device in various embodiments.

With reference to FIG. 3, a schematic of an example processing device 300 is shown, which may implement a server and/or a user device in various embodiments. Processing device 300 is only one example of a suitable processing device and is not intended to suggest any limitation as to the scope of use or functionality of embodiments of the invention described herein. Regardless, processing device 300 is capable of being implemented and/or performing any of the functionality set forth herein.

In processing device 300, there is a computer system 312 which is operational with numerous other general purpose or special purpose computing system environments or configurations. Examples of well-known processing systems, environments, and/or configurations that may be suitable for use with computer system 312 include personal computer systems, server computer systems, hand-held or laptop devices, multiprocessor systems, microprocessor-based systems, minicomputer systems, mainframe computer systems, and distributed cloud computing environments that include any of the above systems or devices, and the like.

Computer system 312 may be described in the general context of computer system executable instructions, such as program modules, being executed by a computer system. Generally, program modules may include routines, programs, objects, components, logic, data structures, and so on that perform particular tasks or implement particular abstract data types. Computer system 312 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system 312 is shown in the form of a general-purpose computing device. Components of computer system 312 may include one or more processors or processing units 316, a system memory 328, and a bus 318 that couples various system components including system memory 328 to one or more processors 316.

Bus 318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 312 typically includes a variety of computer system readable media. Such media may be any available media that is accessible by computer system 312, and includes both volatile and non-volatile media, and removable and non-removable media.

System memory 328 can include computer system readable media in the form of volatile memory, such as random access memory (RAM) 330 and/or cache memory 332. Computer system 312 may further include other removable/non-removable, volatile/non-volatile computer system storage media. By way of example only, storage system 334 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 318 by one or more data media interfaces. As will be further depicted and described below, memory 328 may include at least one program product having a set (e.g., at least one) of program modules that are configured to carry out the functions of embodiments of the invention.

Program/utility 340, having a set (at least one) of program modules 342, may be stored in memory 328 by way of example, and not limitation, as well as an operating system, one or more application programs, other program modules, and program data. Each of the operating system, the one or more application programs, the other program modules, and program data or some combination thereof, may include an implementation of a networking environment. Program modules 342 generally carry out the functions and/or methodologies of embodiments of the invention as described herein.

Computer system 312 may also communicate with one or more external devices 314 such as a keyboard, a pointing device, a display 324, etc.; one or more devices that enable a user to interact with computer system 312; and/or any devices (e.g., network card, modem, etc.) that enable computer system 312 to communicate with one or more other processing devices. Such communication can occur via Input/Output (I/O) interfaces 322. Still yet, computer system 312 can communicate with one or more networks such as a local area network (LAN), a general wide area network (WAN), and/or a public network (e.g., the Internet) via network adapter 320. As depicted, network adapter 320 communicates with the other components of computer system 312 via bus 318. It should be understood that, although not shown, other hardware and/or software components could be used in conjunction with computer system 312. Examples, include: microcode, device drivers, redundant processing units, external disk drive arrays, RAID systems, tape drives, and data archival storage systems, etc.

Figure 4:
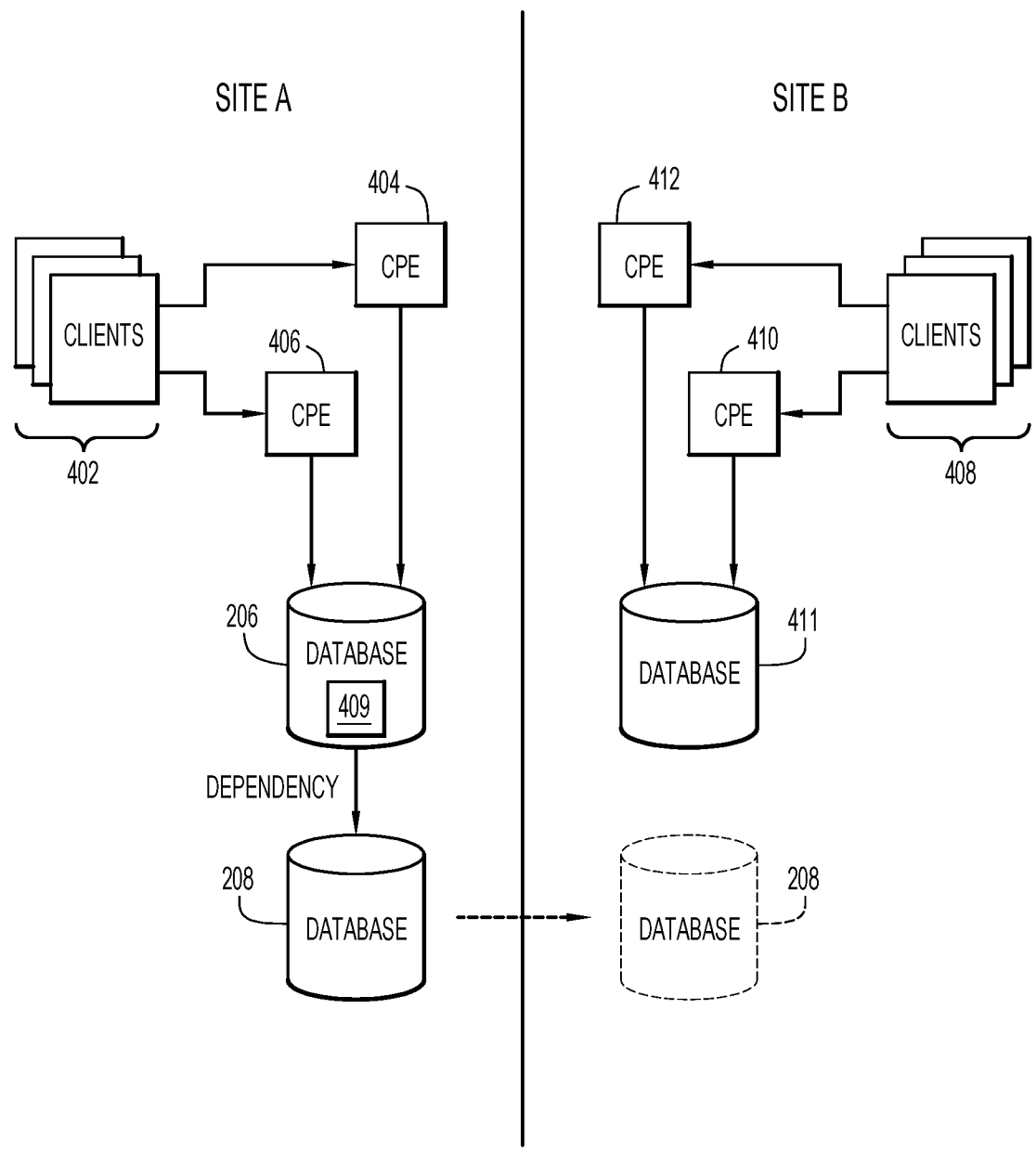
FIG. 4 is a functional block diagram illustrating an example configuration of site A and site B of FIG. 1.

FIG. 4 is a functional block diagram illustrating an example configuration of site A 102 and site B 104. Clients 402 at site A 102, residing on one or more user devices 210, may connect to contact platform engine (CPE) 404 and CPE 406, residing on one or more servers 204, and may request and receive access to data storage system resources of databases 206, 208 directly, but are unable to directly access a data storage system resource of database 411 at site B 104. Similarly, clients 408 at site B 104, residing on one or more user devices (not shown), may connect to CPEs 410, 412 residing on one or more servers (not shown) at site B 104, and may request and receive direct access to a data storage system resource of database 411 at site B 104, but are unable to directly access data storage system resources of databases 206, 208 at site A 102.

If an application executing at site A 102 requires frequent access to data storage system resources of databases 206, 208 such as, for example, a first data repository of database 206 and a second data repository of database 208, problems will arise if an administrator attempts to move database 208 from site A 102 to site B 104. At each site, access to a respective one of the data repositories would be local and fast, while access to another respective one of the data repositories would be remote and slow. As a result, users of the application at site A 102 and site B 104 will not be satisfied with performance of the application.

Assuming that first data repository of database 206 and second data repository of database 208 should be collocated to avoid performance issues, in various embodiments an object 409 declaring a dependency on a data storage system resource of database 208 such as, for example, the second data repository, may be created and stored in a data storage system resource of database 206 such as, for example, the first data repository. When the first data repository is brought online, based on the dependency indicated by object 409 stored in the first data repository, the application may check the second data repository to ensure that the second data repository is online and collocated with the first data repository. If the second data repository is not online or not collocated with the first data repository, then the application may present a warning message to a user. Further, if the user attempts to move the second data repository to another site, a check will be made to determine whether a data storage system resource such as, for example, the first data repository, has stored therein object 409 declaring a dependency on the second data repository, and whether, as a result of the move, the two data repositories would not be collocated. If this is the situation, then the move may be prevented from occurring. Alternatively, instead of preventing the second data repository from being moved, a user or administrator may be presented with a warning regarding potential performance impacts.

Figure 5:
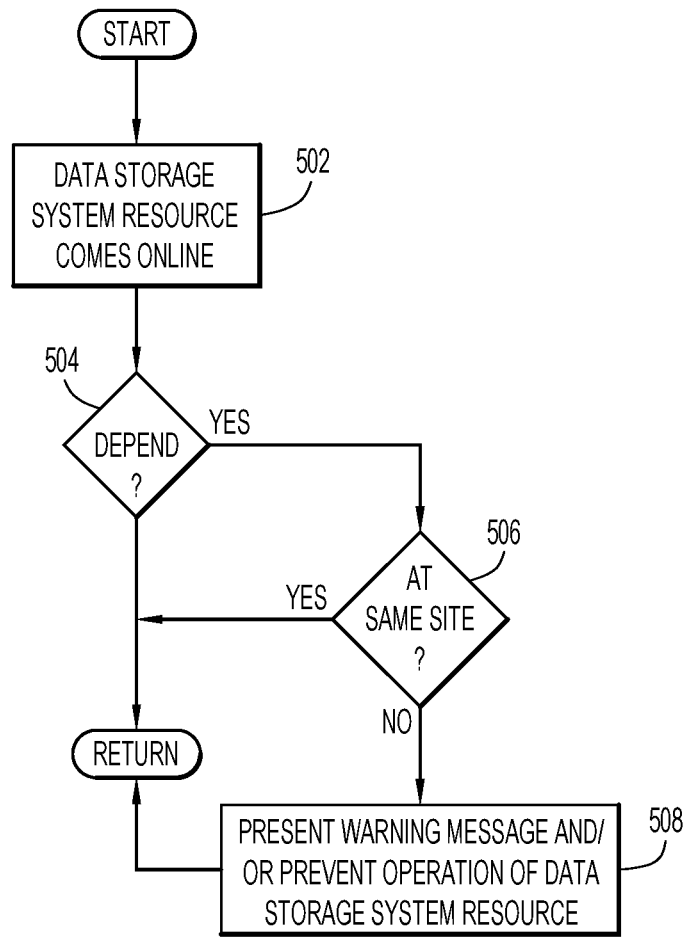
FIG. 5 is a flowchart that illustrates an example process for determining, when a data storage system resource comes online, whether the data storage system resource and one or more other data storage system resources on which the data storage system resource depends are collocated.

FIG. 5 is a flowchart of an exemplary process that an application may execute when a data storage system resource such as, for example, a database or a data repository, comes online. The process may begin with detecting that the data storage system resource comes online (act 502). The process may then check for existence of an object stored in the data storage system resource that declares a dependency with respect to one or more other data storage system resources (act 504). If no object is found, the process may be completed.

Otherwise, if the object exists and declares a dependency with respect to one or more other data storage system resources, then a determination may be made regarding whether the data storage system resource and the one or more other data storage system resources reside at a same site (act 506). If the data storage system resource and the one or more other data storage system resources all reside at the same site, then the process is completed. Otherwise, a warning message may be presented and/or operation of the data storage system resource may be prevented (act 508) and the process may be completed.

Figure 6:
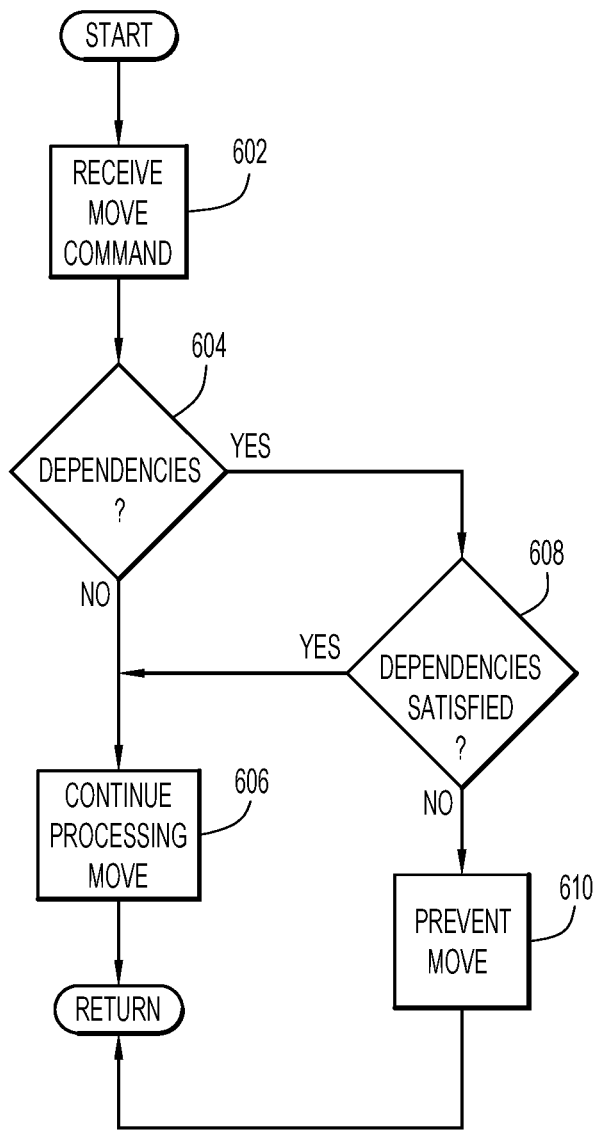
FIG. 6 is a flowchart that illustrates an example process that prevents a move of a data storage system resource when the move would result in any one or more related data storage system resources, as specified in one or more dependencies declared within an object, being located at a different site from the moved data storage system resource.

FIG. 6 is a flowchart illustrating another example process that may be performed in an embodiment. The process may begin with receiving a move command to move a data storage system resource from a first site to a second site (act 602). The process may then determine whether the data storage system resource to be moved includes an object that declares dependencies with respect to one or more other data storage system resources and whether other data storage system resources include a respective object that declares a dependency with respect to the data storage system resource (act 604).

If the data storage system resource to be moved does not include an object that declares dependencies with respect to one or more other data storage system resources and other data storage system resources do not include a respective object that declares a dependency with respect to the data storage system resource, then move processing may be permitted to continue (act 606). Otherwise, a check may be made to determine whether the data storage system resource and the one or more other data storage system resources will be located at a same site if the move is performed (act 608). If the data storage system resource and the one or more other data storage system resources will be determined to be located at the same site after the move is performed, then move processing may be permitted to continue (act 606). Otherwise, the application may prevent the data storage system resource from being moved (act 610).

Figure 7:
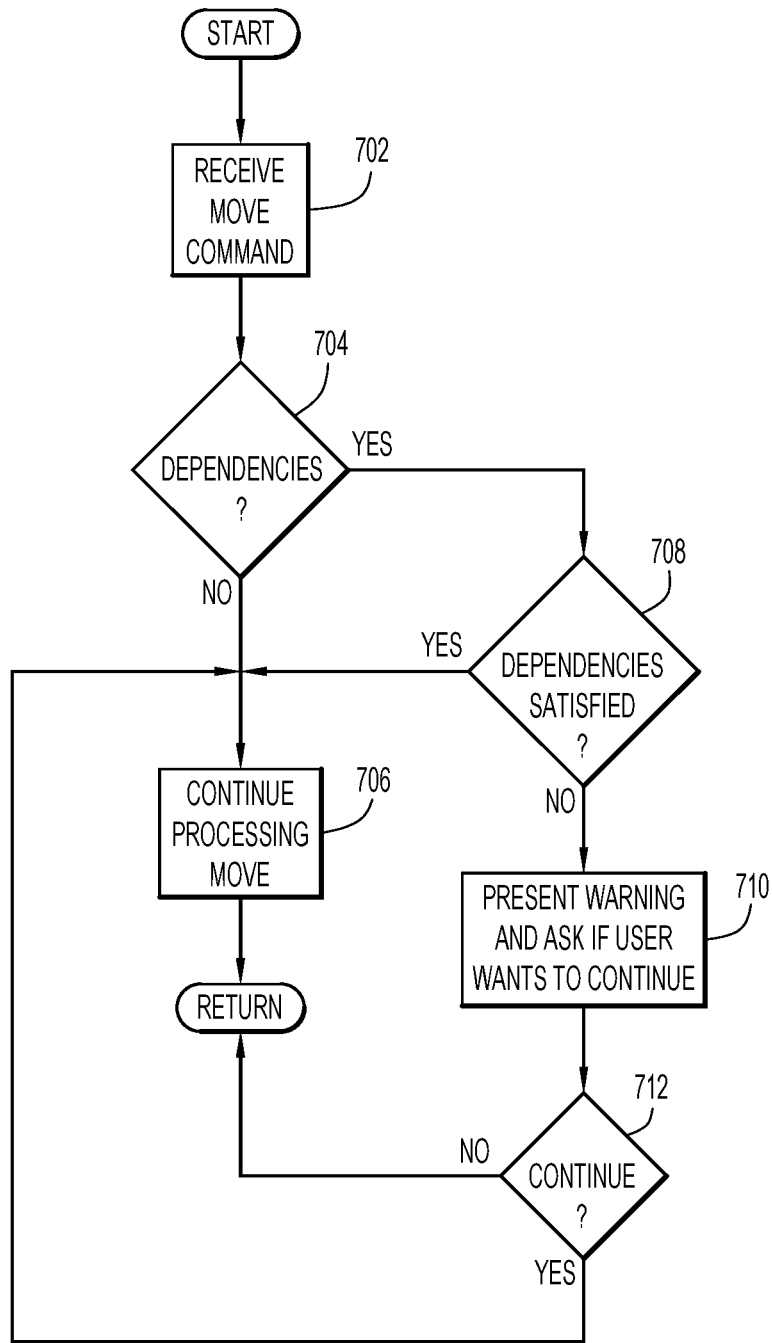
FIG. 7 is a flowchart that illustrates an example process that presents a warning when a move of a data storage system resource would result in any one or more related data storage system resources, as specified in one or more dependencies declared within an object, being located at a different site from the moved data storage system resource.

FIG. 7 is a flowchart illustrating an example process that may be performed in an alternate embodiment. The process may begin with receiving a move command to move a data storage system resource from a first site to a second site (act 702). The process may then determine whether the data storage system resource to be moved includes an object that declares dependencies with respect to one or more other data storage system resources or whether other data storage system resources include a respective object that declares a dependency with respect to the data storage system resource (act 704).

If the data storage system resource to be moved does not include an object that declares dependencies upon one or more other data storage system resources and other data storage system resources do not include a respective object that declares a dependency with respect to the data storage system resource, then move processing may be permitted to continue (act 706). Otherwise, a check may be made to determine whether the data storage system resource and the one or more other data storage system resources will be located at a same site if the move is performed (act 708). If the data storage system resource and the one or more other data storage system resources will be determined to be located at the same site after the move is performed, then move processing may be permitted to continue (act 706). Otherwise, the application may present a warning message to a user and may ask the user whether he or she wishes to continue with the move (act 710). If the user indicates a desire not to continue (act 712), then the process is completed. Otherwise, if the user indicates a desire to continue the move processing, then the move processing is permitted to continue (act 706).

With respect to some applications, a first data storage system resource may depend on a second data storage system resource while the second data storage system resource may not depend on the first data storage system resource. In such a case, an object may be stored at the first data storage system resource and may indicate that the first data storage system resource depends on the second data storage system resource. In this case, when the first data storage system resource comes online, as a result of the object indicating that the first data storage system resource depends on the second data storage system resource, a check may be performed to determine whether the first data storage system resource and the second data storage system resource are collocated. However, the second data storage system resource may not have an object stored therein that declares a dependency with respect to the first data storage system resource. As a result, when the second data storage system resource comes online, the first data storage system resource may not be checked to determine whether the first data storage system resource and the second data storage system resource are collocated.

In applications in which a first data storage system resource depends on a second data storage system resource and the second data storage system resource depends on the first data storage system resource, then a first object may be stored at the first data storage system resource declaring a first dependency with respect to the second data storage system resource and a second object may be stored at the second data storage system resource declaring a second dependency with respect to the first data storage system resource. In this situation, when each respective one of the first data storage system resource and the second data storage system resource comes online, a check is performed to determine whether another respective one of the first data storage system resource and the second data storage system resource are collocated.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, etc.). These systems may include any types of monitors and input devices (e.g., keyboard, mouse, voice recognition, etc.) to enter and/or view information.

It is to be understood that the software of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and may communicate via any suitable communications medium (e.g., LAN, WAN, Intranet, Internet, hardwired, modem connection, wireless, etc.). For example, the functions of the present invention embodiments may be distributed in any manner among the various systems, and/or any other intermediary processing devices. The software and/or algorithms described above and illustrated in the flowchart may be modified in any manner that accomplishes the functions described herein. In addition, the functions in the flowchart or description may be performed in any order that accomplishes a desired operation.

The software of the present invention embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to a server and/or client systems. The database systems and/or storage structures may be remote from or local to the computer or other processing systems, and may store any desired data.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

We claim as our invention:

1. A system comprising:
   at least one processor; and
   at least one memory connected to the at least one processor, the at least one memory having instructions stored therein to configure the at least one processor to:
   in response to receiving a request to move a first data storage system resource of a plurality of data storage system resources to a different geographic location:
      determining that a collocation dependency exists between the first data storage system resource and a second data storage system resource of the plurality of data storage system resources based on an existence of at least one of a first object, including dependency information, stored in the first data storage system resource indicating a collocation dependency of the first data storage system resource with respect to the second data storage system resource and a second object, including dependency information, stored in the second data storage system resource indicating a collocation dependency of the second data storage system resource with respect to the first data storage system resource, wherein a requirement of the collocation dependency is for the first data storage system resource to be located at a same geographic location as the second data storage system resource; and preventing the move in response to determining that the collocation dependency exists and the requirement of the collocation dependency is not met by the move, wherein:

each respective data storage system resource of the plurality of data storage system resources that has a collocation dependency with respect to another respective data storage system resource of the plurality of data storage system resources has a corresponding object, including dependency information, stored in the respective data storage system resource indicating the collocation dependency between the respective data storage system resource and the another respective data storage system resource requiring the respective data storage system resource and the another respective data storage system resource to be located together at a geographic location, and the plurality of data storage system resources are used as data repositories.

2. The system of claim 1, wherein the at least one processor is further configured to provide a notification of degraded performance in response to determining that there exists a second collocation dependency between the first data storage system resource and a third data storage system resource, and the first data storage system resource and the third data storage system resource are not at the same geographic location, wherein the second collocation dependency requires the first data storage system resource and the third data storage system resource to be at the same geographic location.

3. A computer program product comprising:
at least one computer readable storage medium having computer readable program code embodied therewith for execution on a processing system, the computer readable program code being configured to be executed by the processing system to:
in response to receiving a request to move a first data storage system resource of a plurality of data storage system resources to a different geographic location:
determining that a collocation dependency exists between the first data storage system resource and a second data storage system resource of the plurality of data storage system resources based on an existence of at least one of a first object, including dependency information, stored in the first data storage system resource indicating a collocation dependency of the first data storage system resource with respect to the second data storage system resource and a second object, including dependency information, stored in the second data storage system resource indicating a collocation dependency of the second data storage system resource with respect to the first data storage system resource, wherein a requirement of the collocation dependency is for the first data storage system resource to be located at a same geographic location as the second data storage system resource; and preventing the move of the first data storage system resource in response to determining that the collocation dependency exists and the requirement of the collocation dependency is not met by the move, wherein:

each respective data storage system resource of the plurality of data storage system resources that has a collocation dependency with respect to another respective data storage system resource of the plurality of data storage system resources has a corresponding object, including dependency information, stored in the respective data storage system resource indicating the collocation dependency between the respective data storage system resource and the another respective data storage system resource requiring the respective data storage system resource and the another respective data storage system resource to be located together at a geographic location, and the plurality of data storage system resources are used as repositories.

4. The computer program product of claim 3, wherein the computer readable program code is further configured to be executed by the processing system to provide a notification of degraded performance in response to determining that there exists a second collocation dependency between the first data storage system resource and a third data storage system resource, and the first data storage system resource and the third data storage system resource are not at the same geographic location, wherein the second collocation dependency requires the first data storage system resource and the third data storage system resource to be at the same geographic location.

5. The system of claim 1, wherein the move is prevented in response to determining an existence of one or more data objects stored in one or more corresponding data storage system resources declaring a collocation dependency of the one or more corresponding data storage system resources with respect to the first data storage system resource and at least one of the one or more corresponding data storage system resources would be located in a different geographic region than the first data storage system resource as a result of the move.

6. The computer program product of claim 3, wherein the move is prevented in response to determining an existence of one or more data objects stored in one or more corresponding data storage system resources declaring a collocation dependency of the one or more corresponding data storage system resources with respect to the first data storage system resource and at least one of the one or more corresponding data storage system resources would be located in a different geographic region than the first data storage system resource as a result of the move.

* * * * *